United States Patent
Jain

(10) Patent No.: US 7,961,673 B2
(45) Date of Patent: Jun. 14, 2011

(54) SYSTEM AND METHOD FOR CLUSTERING WIRELESS DEVICES IN A WIRELESS NETWORK

(75) Inventor: Amit Jain, Bangalore (IN)

(73) Assignee: Symbol Technologies, Inc., Holtsville, NY (US)

( * ) Notice: Subject to any disclaimer, the term of this patent is extended or adjusted under 35 U.S.C. 154(b) by 171 days.

(21) Appl. No.: 12/360,240

(22) Filed: Jan. 27, 2009

(65) Prior Publication Data

US 2009/0129321 A1 May 21, 2009

Related U.S. Application Data

(63) Continuation of application No. 11/328,567, filed on Jan. 9, 2006, now abandoned.

(51) Int. Cl.
*H04W 4/00* (2009.01)
*G08C 17/00* (2006.01)
*H04B 7/00* (2006.01)

(52) U.S. Cl. ........ 370/328; 370/311; 455/41.2; 455/519

(58) Field of Classification Search .................. 455/41.2, 455/519; 370/328, 311
See application file for complete search history.

(56) References Cited

U.S. PATENT DOCUMENTS

| | | | |
|---|---|---|---|
| 5,508,707 A | 4/1996 | LeBlanc et al. | |
| 5,708,656 A | 1/1998 | Noneman et al. | |
| 6,104,344 A | 8/2000 | Wax et al. | |
| 6,212,194 B1 | 4/2001 | Hsieh | |
| 6,233,236 B1 | 5/2001 | Nelson et al. | |
| 6,366,569 B1 | 4/2002 | Ritter | |
| 6,594,468 B1 | 7/2003 | Ramanathan | |
| 6,738,020 B1 | 5/2004 | Lindskog et al. | |
| 6,853,348 B1 | 2/2005 | Jung et al. | |
| 6,909,399 B1 | 6/2005 | Zegelin et al. | |
| 6,925,094 B2 | 8/2005 | Sharony et al. | |
| 7,035,240 B1 | 4/2006 | Balakrishnan et al. | |
| 7,039,001 B2 | 5/2006 | Krishnan et al. | |
| 7,095,709 B2 | 8/2006 | Walton et al. | |
| 7,099,678 B2 | 8/2006 | Vaidyanathan | |
| 7,110,350 B2 | 9/2006 | Li et al. | |
| 7,151,809 B2 | 12/2006 | Ketchum et al. | |
| 7,164,929 B2 | 1/2007 | Sharony | |

(Continued)

FOREIGN PATENT DOCUMENTS

EP 1185048 3/2002

(Continued)

OTHER PUBLICATIONS

Shreedhar, M.; Varghese, George, "Efficient Fair Queuing Using Deficit Round-Robin," IEEE/ACM Transactions on Networking, vol. 4, No. 3, Jun. 1996, pp. 375-385.

(Continued)

*Primary Examiner* — Jinsong Hu
*Assistant Examiner* — Marisol Figueroa

(57) ABSTRACT

Described are a system and method for clustering wireless devices in a wireless network. The system comprises a wireless access point and a plurality of wireless computing units grouped into a cluster as a function of a predetermined parameter. The cluster includes a cluster head unit and at least one cluster member unit. The at least one cluster member unit utilizes a first power level when wirelessly communicating with the cluster head unit, and the cluster head unit utilizes a second power level when communicating with the AP.

5 Claims, 2 Drawing Sheets

U.S. PATENT DOCUMENTS

| | | | |
|---|---|---|---|
| 7,277,414 | B2 | 10/2007 | Younis et al. |
| 7,590,064 | B1 * | 9/2009 | Zhang et al. .................. 370/235 |
| 2002/0034263 | A1 | 3/2002 | Schmidl et al. |
| 2002/0041635 | A1 | 4/2002 | Ma et al. |
| 2002/0168992 | A1 | 11/2002 | Eiden et al. |
| 2002/0181390 | A1 | 12/2002 | Mody et al. |
| 2003/0023915 | A1 | 1/2003 | Choi |
| 2003/0048770 | A1 | 3/2003 | Proctor |
| 2003/0072452 | A1 | 4/2003 | Mody et al. |
| 2003/0120705 | A1 | 6/2003 | Chen et al. |
| 2003/0154435 | A1 | 8/2003 | Claussen et al. |
| 2003/0161421 | A1 | 8/2003 | Schmidt et al. |
| 2003/0222823 | A1 | 12/2003 | Flint et al. |
| 2003/0235147 | A1 | 12/2003 | Walton et al. |
| 2004/0013128 | A1 | 1/2004 | Moreton et al. |
| 2004/0023621 | A1 | 2/2004 | Sugar et al. |
| 2004/0033806 | A1 | 2/2004 | Daniel et al. |
| 2004/0042493 | A1 | 3/2004 | Emmot |
| 2004/0066754 | A1 | 4/2004 | Hottinen |
| 2004/0082356 | A1 | 4/2004 | Walton et al. |
| 2004/0179627 | A1 | 9/2004 | Ketchum et al. |
| 2004/0258025 | A1 | 12/2004 | Li et al. |
| 2004/0266465 | A1 | 12/2004 | Zegelin et al. |
| 2005/0047343 | A1 | 3/2005 | Sharony et al. |
| 2005/0096091 | A1 | 5/2005 | Sharony |
| 2005/0135321 | A1 | 6/2005 | Sharony |
| 2006/0221873 | A1 | 10/2006 | Sharony |
| 2006/0221904 | A1 | 10/2006 | Sharony |
| 2006/0221928 | A1 | 10/2006 | Sharony |

FOREIGN PATENT DOCUMENTS

| | | |
|---|---|---|
| WO | 0034799 | 6/2000 |
| WO | 03084160 | 10/2003 |
| WO | 2005006638 | 1/2005 |
| WO | 2005034444 | 4/2005 |

OTHER PUBLICATIONS

Semeria, Chuck; "Supporting Differentiated Service Classes: Queue Scheduling Disciplines," Juniper Networks, Inc., 2001, 27 pages.

Varghese, George; "Basic QoS Mechanisms Used in Routers," Mar. 5, 2002, 20 pages.

Musunuri R. et al.: "Hierarchical-battery aware routing in wireless sensor networks" Vehicular Technology Conference, 2005. VTC-2005-Fall. 2005 IEEE 62nd Dallas, TX, USA Sep. 25-28, 2005, Piscataway, NJ, USA, IEEE, Sep. 25, 2005, pp. 2311-2315, XP010878865; ISBN: 0-7803-9152-7, the whole document.

* cited by examiner

SYSTEM AND METHOD FOR CLUSTERING WIRELESS DEVICES IN A WIRELESS NETWORK

CROSS-REFERENCE TO RELATED APPLICATION

This application is a continuation of U.S. patent application Ser. No. 11/328,567, filed Jan. 9, 2006 (the content of which is incorporated by reference herein).

TECHNICAL FIELD

The invention generally relates to clustering wireless computing devices in a wireless network.

BACKGROUND

A conventional wireless network may operate in one of two distinct modes: an infrastructure mode and an ad hoc mode. In the infrastructure mode, a mobile unit ("MU") transmits wireless signals to other MUs via an access point ("AP"). The MU utilizes a maximum power level when transmitting to the AP, regardless of the proximity to the AP, consuming a significant amount of battery power and potentially causing interference with communications between one of the other MUs and a further AP. In the ad hoc mode, the MU communicates directly with another MU, i.e., without use of the AP. However, the ad hoc mode cannot typically support a large number of MUs, and these MUs, while in the ad hoc mode, cannot bridge to the wireless network (e.g., a WLAN) or the Internet, limiting functionality. Therefore, there is a need for an improved network architecture.

BRIEF SUMMARY

The present invention relates to a system and method for clustering wireless devices in a wireless network. The system comprises a wireless access point and a plurality of wireless computing units grouped into a cluster as a function of a predetermined parameter. The cluster includes a cluster head unit and at least one cluster member unit. The at least one cluster member unit utilizes a first power level when wirelessly communicating with the cluster head unit, and the cluster head unit utilizes a second power level when communicating with the AP.

DETAILED DESCRIPTION

Figure 1:
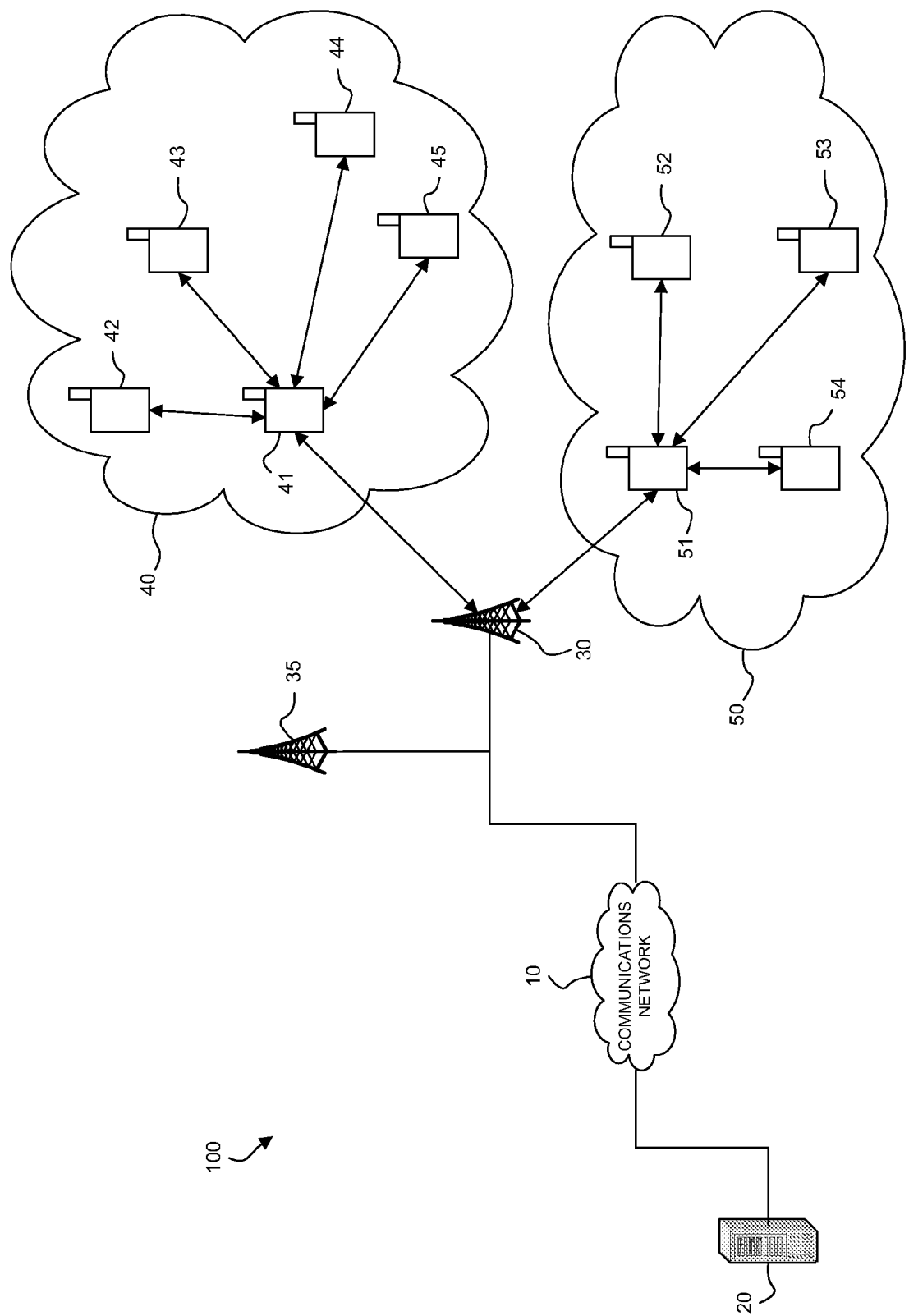
FIG. 1 shows an exemplary embodiment of a system according to the present invention.

The present invention may be further understood with reference to the following description and the appended drawings, wherein like elements are provided with the same reference numerals. The present invention describes a system and method for clustering wireless devices in a wireless network. In particular, the present invention relates to an improved wireless network architecture that, for example, uses location information of wireless computing units to form clusters thereof. As will be understood by the following description, the present invention may be utilized to limit power consumption by the wireless devices and improve throughput in the wireless network.

FIG. 1 shows an exemplary embodiment of a system 100 according to the present invention. The system 100 may include a communications network 10 (e.g., a wired/wireless LAN, WAN or the Internet) having at least one access point/port ("AP"), such as an AP 30 and/or an AP 35, providing access thereto. The system 100 may further include a server 20 in communication with the network 10. The network 10 may include a plurality of interconnected computing devices such as, for example, servers, hubs, routers, switches, etc.

The system 100 may include a plurality of wireless computing devices (e.g., mobile units ("MUs")), such as MUs 41-45 and 51-54. Each MU may include, for example, a laser/image-based scanner, an RFID reader/tag, a cell phone, a PDA, a network interface card, etc. The MUs 41-54 may conduct wireless communications over network 10 via an AP (e.g., AP 30). When the MUs 41-54 utilize the AP 30 to communicate over the network 10, the MUs transmit packets at a first power level (e.g., a maximum power level) regardless of the proximity to the AP 30. Each MU may also communicate directly with another MU without use of the AP 30. During this direct communication between MUs and/or while the MUs are clustered, the transmitting MU may utilize a second power level. These methodologies of communication will be described further below.

According to exemplary embodiments of the present invention, two or more MUs may be grouped into a cluster for improved communications between the cluster and an AP. In one exemplary embodiment, the MUs in the cluster may be in an infrastructure mode, communicating with each other via the AP. However, the MUs may also be in an ad-hoc mode with a cluster-head MU (described below) for communication therebetween when, for example, the MUs are unable to communicate directly with the AP or the MUs are within a predetermined communicable range of each other or the cluster-head MU. That is, the MUs in the clusters may send first data (e.g., high priority data—e.g., voice) directly to the AP while sending second data (e.g., low priority) to the cluster-head MU which aggregates data from a plurality of MUs (including itself) before forwarding the data to the AP, as will be explained below. The cluster may be formed based on a plurality of factors such as geographical proximity of the MUs to one another and/or the AP, an internal load level, a battery level, a hardware configuration, RF range between MUs, etc. For example, the MUs 41-45 may be grouped into a cluster 40 and the MUs 51-54 may be grouped into a cluster 50. In a preferred embodiment, each cluster includes one cluster-head MU and at least one cluster-member MU. For example, the cluster 40 may include the cluster-head MU 41 and the cluster-member MUs 42-45. Similarly, the MU 51 may be the cluster-head of the cluster 50 and the MUs 51-54 are the cluster-member MUs.

In one exemplary embodiment, a particular MU (e.g., the MU 41) may be designated as the cluster head MU as a function of, for example, an amount of data the MU is going to transmit. For example, the MU 41 may have a largest amount of data (e.g., as measured in bytes) to transmit. Thus, the MU 41 may be selected as an initial cluster head MU for the cluster 40. In another exemplary embodiment, the MU 41 may function as the cluster head for a predetermined time proportional to the amount of data it is going to transmit. For example, if a total data to be transmitted by the MUs 41-45 equaled 100 bytes, and the MU 41 had 50 bytes to transmit, the MU 41 may be designated as the cluster head MU for 50% of the time the cluster 40 is intact. When the predetermined time expires, the MU with a second largest amount of data to transmit may be designated as a subsequent cluster head MU, and so on, until each MU functions as the cluster head MU.

Inter-cluster communication, i.e., between the cluster head MU and the AP, may utilize a conventional IEEE 802.11x protocol which may be the same as or different from the protocol used for intra-cluster communication. The cluster head MU (e.g., MU 41) may communicate with the AP (e.g., AP 30) at the first power level (e.g., maximum power). Each cluster head MU (e.g., the MUs 41 and 51) associated with the AP (e.g., AP 30) may utilize a CSMA/CA mechanism when communicating therewith.

Intra-cluster communication, i.e., between the cluster-member MUs and/or between the cluster-member MUs and the cluster head MU, may occur using a conventional IEEE 802.11x protocol. For example, each MU in the cluster may utilize a CSMA/CA mechanism to limit congestion and interference within the cluster. Furthermore, intra-cluster communication (e.g., between the cluster member MU and the cluster head MU) may occur at the second power level. In one exemplary embodiment, the second power level is no more than about 2 mW. In another exemplary embodiment, the second power level is variable as a function of a size of the cluster. For example, as the number of MUs in the cluster increases and/or the geographic distance or RF range between MUs increases, the second power level may increase.

When one of the cluster member MUs has data to transmit out of the cluster, e.g., to the AP 30, the network 10, etc., the cluster head MU may function as an aggregation point for data from the cluster member MUs. For example, when the MU 42 has a packet to transmit to the server 20, the packet is first sent to the MU 41. Depending on a type of the data in the packet (e.g., data, voice, video, etc.), the MU 41 may aggregate the packet with one or more packets previously received/stored by the MU 41 which has not been transmitted to the AP 30. That is, the MU 41 may include the packet from the MU 42 with packets from one or more other MUs in the cluster 40, including a packet from the MU 41. The aggregated packet may then be transmitted to the AP 30. Disaggregation of an aggregated packet by the MU 41 may occur in a similar manner. That is, the MU 41 may receive an aggregated packet from the AP 30, divide the aggregated packet into individual packets intended for each recipient MU and distribute the individual packets to the corresponding MU(s).

As noted above, both aggregation and disaggregation may be sensitive to the type of data being transmitted. For example, when data which is sensitive to latency (e.g., VoIP packets) or marked as an emergency transmission is received by the MU 41, it may transmit the data without dis/aggregation. In this instance, there may be a plurality of rounds of dis/aggregation executed at the cluster head MU, as will be further described below. Whether to utilize the aggregation may be determined as a function of one or more predetermined factors, e.g., clustering efficiency, power saving, etc. The clustering efficiency may include any inter-cluster interference. For example, clusters may be located adjacent to each other so that even low power communications may degrade the clustering efficiency. This may be accounted for when determining the cluster efficiency.

Similarly, in an instance where the data is larger than a fragmentation threshold, fragmentation may be performed for data communicated between the cluster head MU and the AP and between the cluster head MU and the cluster member MUs.

Those of skill in the art will understand that the cluster may include two or more cluster-head MUs, and/or the cluster may further be subdivided into a plurality of sub-clusters with each sub-cluster having a structure similar to one of the cluster.

As one of ordinary skill in the art will understand, membership in the cluster may change dynamically depending on, for example, proximity of the MUs relative to each other. As shown in FIG. 1, the MU 45 is the cluster-member MU of the cluster 40. However, if the MU 45 changes location (e.g., in a direction towards the MUs 51-54), then the MU 45 may become a cluster-member of the cluster 50.

Figure 2:
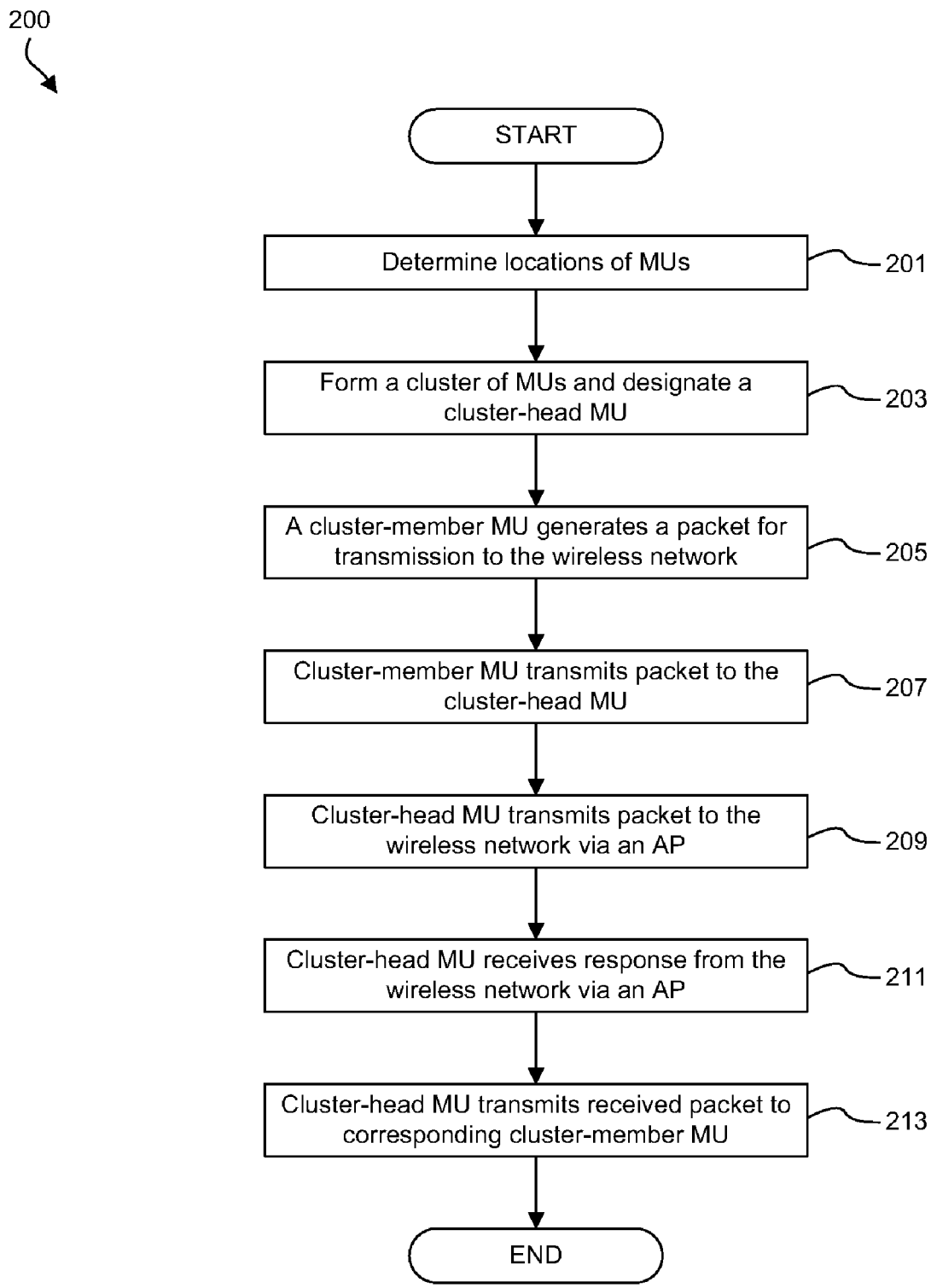
FIG. 2 shows an exemplary embodiment of a method according to the present invention.

FIG. 2 shows an exemplary method 200 of communication according to the present invention. The method 200 is described with reference to the system 100 in FIG. 1. Those skilled in the art will understand that other systems having varying configurations, for example, different numbers of networks, APs, and MUs may also be used to implement the exemplary method.

In step 201, locations and/or relative locations of the MUs which are in communication with the network 10 may be determined using any real-time locationing algorithm or any other methods known to those of ordinary skill in the art. For example, a Received Signal Strength Indication ("RSSI") may be measured by one or more APs to determine the locations of the MUs. That is, the server 20 may generate and transmit a signal via one or more APs (e.g., APs 30 and/or 35). Each MU may then transmit a response signal to the APs 30 and/or 35 which forward it to the server 20. The server 20 may then measure the RSSI for the response signals and compare it with predetermined geographically marked locations or points (e.g., within the network 10) to determine the relative locations of the MUs (e.g., the MUs 41-45 and 51-54). Alternatively, or in combination, a Time Difference Of Arrival ("TDOA") method may be utilized to determine the relative locations of the MUs.

In step 203, the MUs are formed into one or more clusters based on a plurality of factors as mentioned herein. In the exemplary embodiment, the MUs form the cluster as a function of their relative locations to each other. That is, when the MUs 41-45 are within a predetermined distance and/or RF range of each other, they form the cluster 40. When the cluster 40 is formed, each of the MUs 41-45 are cluster member MUs.

Also, in step 203, a cluster-head MU is selected from among the cluster member MUs as a function of, for example, an amount of data each MU has stored for transmission at a preselected time (e.g., at formation of the cluster). For example, the MU 41 may be selected as the cluster-head MU of the cluster 40, because the MU 41 has more data to transmit than the MUs 42-45.

As one of ordinary skill in the art will understand, steps 201 and 203 may be repeated at any predetermined time interval, upon request by a user or upon occurrence of a predetermined event. For example, if the MU 41 terminates membership in the cluster 40 (e.g., powers down/works offline, leaves RF range of MUs 42-45, etc.), the membership in the cluster 40 may be reassessed and a new cluster head may be selected. In a preferred embodiment, the new cluster head is the MU with a second largest amount of data to transmit after the MU 41. Additionally, as described above, the cluster head designation may be reassigned so that each MU in the cluster functions as the cluster head for a time proportional to an amount of data for transmission (e.g., the more data to transmit, the more time functioning as the cluster head). Therefore, the MUs included in a cluster and/or the cluster-head MU may change over time.

In step 205, one or more cluster-member MUs and/or the cluster head MU, generates a packet for transmission to the AP. For example, the cluster-member MU 43 generates a packet for transmission to the AP 30. In step 207, the cluster-member MU 43 transmits the packet to the cluster-head MU 41. As described above, the MUs 41-45 may utilize the second power level for intra-cluster communications. Thus, the cluster-member MU 43 may transmit its packet to the cluster head MU 41 at the second power level. As described above, in an exemplary embodiment, the second power level is no more than 2 mW; however, the second power level may vary with a geographic distance and/or RF range covered by the cluster.

In step 209, the cluster-head MU 41 transmits the packet from the MU cluster-member 43 to the AP 30. As described above, the cluster head MU may utilize the first power level (e.g., maximum power) when transmitting to the AP. In an exemplary embodiment, the MU 41 may have received or be waiting to receive packets from the other cluster-member MUs (e.g., MUs 42, 44, 45) for transmission to the AP. Thus, the MU 41 may aggregate the packets from itself and the MUs in the cluster into fewer (e.g., one) packet(s) prior to transmission to the AP 30. The aggregate packet may be transmitted to the AP 30. Those of skill in the art will understand that transmission of the aggregated packet may result in decreased congestion and/or interference in the network 10 and less overhead. Thus, in the example described above, the packet from the MU 43 may be transmitted to the AP 30 by itself or as part of an aggregate packet which contains a plurality of packets.

According to the present invention, the cluster head MU may suspend aggregation as a function of, for example, a type of packet. For example, if the packet from the MU 43 is a voice packet (e.g., VoIP) or an emergency/urgent packet, the MU 41 may transmit the voice packet to the AP 30 by itself. Alternatively, the MU 41 may receive the voice packet during aggregation. Thus, when the MU 41 receives the voice packet, it may aggregate the voice packet into the aggregated packet and immediately transmit the aggregated packet to the AP 30 without waiting for data packets from other cluster-member MUs. The MU 41 may then resume aggregation upon receipt of packets from the cluster member MUs.

In step 211, the cluster-head MU 41 receives a response signal from the AP 30. The response signal may include packets for one or more of the cluster member MUs and/or the cluster head MU. The cluster-head MU 41 may determine whether the response signal includes response packets for one or more of the MUs 41-45 by disaggregating the response signal. Those of skill in the art will understand that disaggregation in downstream communication may be optional. Also, the AP 30 may transmit directly to the cluster member MUs.

In step 213, the response packet(s) are then transmitted to the corresponding MU(s) (e.g., the MU 43). Those of skill in the art will understand that the above-description with respect to aggregation as a function of packet type applies similarly to disaggregation. That is, the MU 41 may receive a plurality of response signals from the AP 30 before disaggregating and distributing the response packets to the corresponding MUs. However, in one exemplary embodiment, when at least one of the response packets includes voice and/or emergency data, the MU 41 may transmit that response packet to the corresponding MU without waiting for further response signals from the AP 30.

In another exemplary embodiment of the present invention, an efficacy factor may be computed for each cluster in the system 100 as a function of RF proximity of MUs for a given power level. For example, a histogram may be generated for the MUs in the system 100 based on an amount of data transmitted by each MU. Each cluster, with a data byte count in a predefined range, may have a different efficacy factor. The efficacy factor of each cluster may be utilized to determine a benefit in throughput and power consumption provided by utilizing the present invention. Thus, any algorithm granting permission to a cluster to transmit uplink data (e.g., cluster head to AP) may utilize the efficacy factor.

The present invention provides several advantages both at the network level and the MU level. By allowing simultaneous or substantially simultaneous intra-cluster communication of adjacent clusters, the throughput of the network may increase without a concomitant increase in interference and congestion. Additionally, by allowing intra-cluster communication at a lower power level than inter-cluster communication, the MUs in the cluster may consume less power and extend a life of their power sources (e.g., batteries).

The present invention has been described with reference to an embodiment having the MUs 41-45 and 51-54, the network 10, and the APs 30 and 35. One skilled in the art would understand that the present invention may also be successfully implemented, for example, for any number of MUs, APs, and/or a plurality of the networks 10. Accordingly, various modifications and changes may be made to the embodiments without departing from the broadest spirit and scope of the present invention as set forth in the claims that follow. The specification and drawings are accordingly to be regarded in an illustrative rather than restrictive sense.

What is claimed is:

1. A method of operating wireless computing units in a wireless network system having a wireless access point (AP), the method comprising:
    grouping a plurality of wireless computing units into a cluster, the plurality of wireless computing units including a first wireless computing unit having the largest amount of data to transmit relative to the plurality of wireless computing units, and a second wireless computing unit having the second-largest amount of data to transmit relative to the plurality of wireless computing units;
    designating the first wireless computing unit as a cluster head unit;
    designating the second wireless computing unit and any remaining ones of the plurality of wireless computing units as cluster member units;
    transmitting data from the first wireless computing unit to the AP for a first predetermined time proportional to the amount of data to be transmitted by the first wireless computing unit;
    thereafter, re-designating the second wireless computing unit as the cluster head unit;
    re-designating the first wireless computing unit and any remaining ones of the plurality of wireless computing units as cluster member units; and
    transmitting data from the second wireless computing unit to the AP for a second predetermined time proportional to the amount of data to be transmitted by the second wireless computing unit.

2. The method of claim 1, wherein:
    the plurality of wireless computing units includes a third wireless computing unit having the third-largest amount of data to transmit relative to the plurality of wireless computing units; and
    the method further comprises:
        after transmitting data from the second wireless computing unit to the AP for the second predetermined time, re-designating the third wireless computing unit as the cluster head unit;
        re-designating the second wireless computing unit and any remaining ones of the plurality of wireless computing units as cluster member units; and transmitting data from the third wireless computing unit to the AP for a third predetermined time proportional to the amount of data to be transmitted by the third wireless computing unit.

3. The method of claim 1, wherein:

cluster member units send high priority data directly to the AP using a first power level; and cluster member units send low priority data to the cluster head unit using a second power level.

4. The method of claim 3, wherein the first power level is a maximum transmit power level.

5. The method of claim 3, wherein the high priority data is sensitive to latency, relative to the low priority data.

* * * * *